United States Patent [19]

Ji et al.

[11] Patent Number: 5,623,600

[45] Date of Patent: Apr. 22, 1997

[54] VIRUS DETECTION AND REMOVAL APPARATUS FOR COMPUTER NETWORKS

[75] Inventors: Shuang Ji, Foster City; Eva Chen, Cupertino, both of Calif.

[73] Assignee: Trend Micro, Incorporated, Cupertino, Calif.

[21] Appl. No.: 533,706

[22] Filed: Sep. 26, 1995

[51] Int. Cl.$^6$ .................................................. G06F 11/34
[52] U.S. Cl. .................... 395/187.01; 364/286.4; 364/DIG. 1
[58] Field of Search ................... 395/186, 187.1, 395/200.06; 380/4; 364/285.1, 286.4

[56] References Cited

U.S. PATENT DOCUMENTS

| | | | |
|---|---|---|---|
| 4,975,950 | 12/1990 | Lentz | 380/4 |
| 5,319,776 | 6/1994 | Hile et al. | 395/187.01 |
| 5,414,833 | 5/1995 | Hershey et al. | 395/575 |
| 5,440,723 | 8/1995 | Arnold et al. | 395/181 |
| 5,444,850 | 8/1995 | Chang | 395/200 |
| 5,448,668 | 9/1995 | Perelson et al. | 395/182 |
| 5,452,442 | 9/1995 | Kephart | 395/183 |
| 5,485,575 | 1/1996 | Chess et al. | 395/183 |
| 5,491,791 | 2/1996 | Glowny et al. | 395/183 |
| 5,511,163 | 4/1996 | Lerche et al. | 395/183.15 |

FOREIGN PATENT DOCUMENTS

| | | | |
|---|---|---|---|
| 666671 | 8/1995 | European Pat. Off. | H04L 29/06 |
| 6350784 | 6/1994 | Japan | H04N 1/00 |
| 9322723 | 11/1993 | WIPO | G06F 11/00 |

Primary Examiner—Robert W. Beausoliel, Jr.
Assistant Examiner—Albert Decady
Attorney, Agent, or Firm—Christopher M. Tobin; Greg T. Sueoka

[57] ABSTRACT

A system for detecting and eliminating viruses on a computer network includes a File Transfer Protocol (FTP) proxy server, for controlling the transfer of files and a Simple Mail Transfer Protocol (SMTP) proxy server for controlling the transfer of mail messages through the system. The FTP proxy server and SMTP proxy server run concurrently with the normal operation of the system and operate in a manner such that viruses transmitted to or from the network in files and messages are detected before transfer into or from the system. The FTP proxy server and SMTP proxy server scan all incoming and outgoing files and messages, respectively, before transfer for viruses and then transfer the files and messages, only if they do not contain any viruses. A method for processing a file before transmission into or from the network includes the steps of: receiving the data transfer command and file name; transferring the file to a system node; performing virus detection on the file; determining whether the file contains any viruses; transferring the file from the system to a recipient node if the file does not contain a virus; and deleting the file if the file contains a virus.

22 Claims, 12 Drawing Sheets

| OSI Layer | Protocol Implementation | | | |
|---|---|---|---|---|
| 406 Application | 423 File Tranfer | 424 Electronic Mail | 425 Terminal Emulation | 426 Network Management |
| | 421 FTP Proxy Server | 422 SMTP Proxy server | | |
| 405 Presentation / 404 Session | 417 File Tranfer Protocol (FTP) | 418 Simple Mail Tranfer Protocol (SMTP) | 419 TELNET Protocol | 420 Simple Network Management Protocol (SNMP) |
| 403 Transport | 415 Transmission Control Protocol (TCP) | | 416 User Datagram Protocol (UDP) | |
| 402 Network | 412 Address Resolution | 413 Internet Protocol (IP) | | 414 Internet Control Message Protocol (ICMP) |
| 401 Data Link | 411 Network Interface Cards: Ethernet, StarLAN token Ring | | | |
| 400 Physical | 410 Transmission media: twisted pair, coax or Fiber Optics | | | |

*FIG. 4*

VIRUS DETECTION AND REMOVAL APPARATUS FOR COMPUTER NETWORKS

BACKGROUND OF THE INVENTION

1. Field of the Invention

The present invention relates generally to computer systems and computer networks. In particular, the present invention relates to a system and method for detecting and removing computer viruses. Still more particularly, the present invention relates to a System and method for detecting and removing computer viruses from file and message transfers between computer networks.

2. Description of the Related Art

During the recent past, the use of computers has become widespread. Moreover, the interconnection of computers into networks has also become prevalent. Referring now to FIG. 1, a block diagram of a portion of a prior art information system 20 is shown. The portion of the information system 20 shown comprises a first network 22, a second network 24 and third network 26. This information system 20 is provided only by way of example, and those skilled in the art will realize that the information system 20 may include any number of networks, each of the networks being its own protected domain and having any number of nodes. As shown in FIG. 1, each of the networks 22, 24, 26 is formed from a plurality of nodes 30, 32. Each of the nodes 30, 32 is preferably a microcomputer. The nodes 30, 32 are coupled together to form a network by a plurality of network connections 36. For example, the nodes 30, 32 may be connected together using a token ring format, ethernet format or any of the various other formats known in the art. Each of the networks 22, 24, 26 includes a node 32 that acts as a gateway to link the respective network 22, 24, 26 to other networks 22, 24, 26. Each of the gateway nodes 32 is preferably coupled by a standard telephone line connection 34 such as POTS (Plain Old Telephone Service) or a T-1 link to the other gateway nodes 32 through a telephone switching network 28. All communication between the networks 22, 24, 26 is preferably performed through one of the gateway nodes 32.

One particular problem that has plagued computers, in particular microcomputers, have been computer viruses and worms. A computer virus is a section of code that is buried or hidden in another program. Once the program is executed, the code is activated and attaches itself to other programs in the system. Infected programs in turn copy the code to other programs. The effect of such viruses can be simple pranks that cause a message to be displayed on the screen or more serious effects such as the destruction of programs and data. Another problem in the prior art is worms. Worms are destructive programs that replicate themselves throughout disk and memory using up all available computer resources eventually causing the computer system to crash. Obviously, because of the destructive nature of worms and viruses, there is a need for eliminating them from computers and networks.

The prior art has attempted to reduce the effects of viruses and prevent their proliferation by using various virus detection programs. One such virus detection method, commonly referred to as behavior interception, monitors the computer or system for important operating system functions such as write, erase, format disk, etc. When such operations occur, the program prompts the user for input as to whether such an operation is expected. If such an operation is not expected (e.g., the user was not operating any program that employed such a function), the user can abort the operation knowing it was being prompted by a virus program. Another virus detection method, known as signature scanning, scans program code that is being copied onto the system. The system searches for known patterns of program code used for viruses. Currently, signature scanning only operates on the floppy disk drives, hard drives or optical drives. Yet another prior art approach to virus detection performs a checksum on all host programs stored on a system and known to be free from viruses. Thus, if a virus later attaches itself to a host program, the checksum value will be different and the presence of a virus can be detected.

Nonetheless, these approaches of the prior art suffer from a number of shortcomings. First, behavior interception is not successful at detecting all viruses because critical operations that may be part of the code for a virus can be placed at locations where such critical operations are likely to occur for the normal operation of programs. Second, most signature scanning is only performed on new inputs from disk drives. With the advent of the Internet and its increased popularity, there are no prior art methods that have been able to successfully scan connections 36 such as those utilized by a gateway node in communicating with other networks. Third, many of the above methods require a significant amount of computing resources, which in turn degrades the overall performance of system. Thus, operating the virus detection programs on every computer becomes impractical. Therefore, the operation of many such virus detection programs is disabled for improved performance of individual machines.

Therefore, there is a need for a system and method for effectively detecting and eliminating viruses without significantly effecting the performance of the computer. Moreover, there is a need for a system and method that can detect and eliminate viruses in networks attached to other information systems by way of gateways or the Internet.

SUMMARY OF THE INVENTION

The present invention overcomes the limitations and shortcomings of the prior art with an apparatus and method for detecting and eliminating viruses on a computer network. A system including the present invention is a network formed of a plurality of nodes and a gateway node for connection to other networks. The nodes are preferably microcomputers, and the gateway node comprises: a display device, a central processing unit, a memory forming the apparatus of the present invention, an input device, a network link and a communications unit. The memory further comprises an operating system including a kernel, a File Transfer Protocol (FTP) proxy server, and a Simple Mail Transfer Protocol (SMTP) proxy server. The central processing unit, display device, input device, and memory are coupled and operate to execute the application programs stored in the memory. The central processing unit of the gateway node also executes the FTP proxy server for transmitting and receiving files over the communications unit, and executes the SMTP proxy server for transmitting and receiving messages over the communications unit. The FTP proxy server and SMTP proxy server are preferably executed concurrently with the normal operation of the gateway node. The servers advantageously operate in a manner such that viruses transmitted to or from the network in messages and files are detected before the files are transferred into or from the network. The gateway node of the present invention is particularly advantageous because the impact of using the FTP proxy server and SMTP proxy server for the detection of viruses is minimized because only the files leaving or entering the network are evaluated for the presence of viruses and all other "intra" network traffic is unaffected.

The present invention also comprises a method for processing a file before transmission into the network and a method for processing a file before transmission from the network. The preferred method for processing a file comprises the steps of: receiving the data transfer command and file name; transferring the file to the proxy server; performing virus detection on the file; determining whether the file contains any viruses; transferring the file from the proxy server to a recipient node if the file does not contain a virus; and performing a preset action with the file if it does contain a virus. The present invention also includes methods for processing messages before transmission to or from the network that operate in a similar manner.

BRIEF DESCRIPTION OF THE DRAWINGS

FIG. 4 is a block diagram of a preferred embodiment for a protocol layer hierarchy constructed according to the present invention compared to the OSI layer model of the prior art;

DETAILED DESCRIPTION OF THE PREFERRED EMBODIMENT

Figure 1:
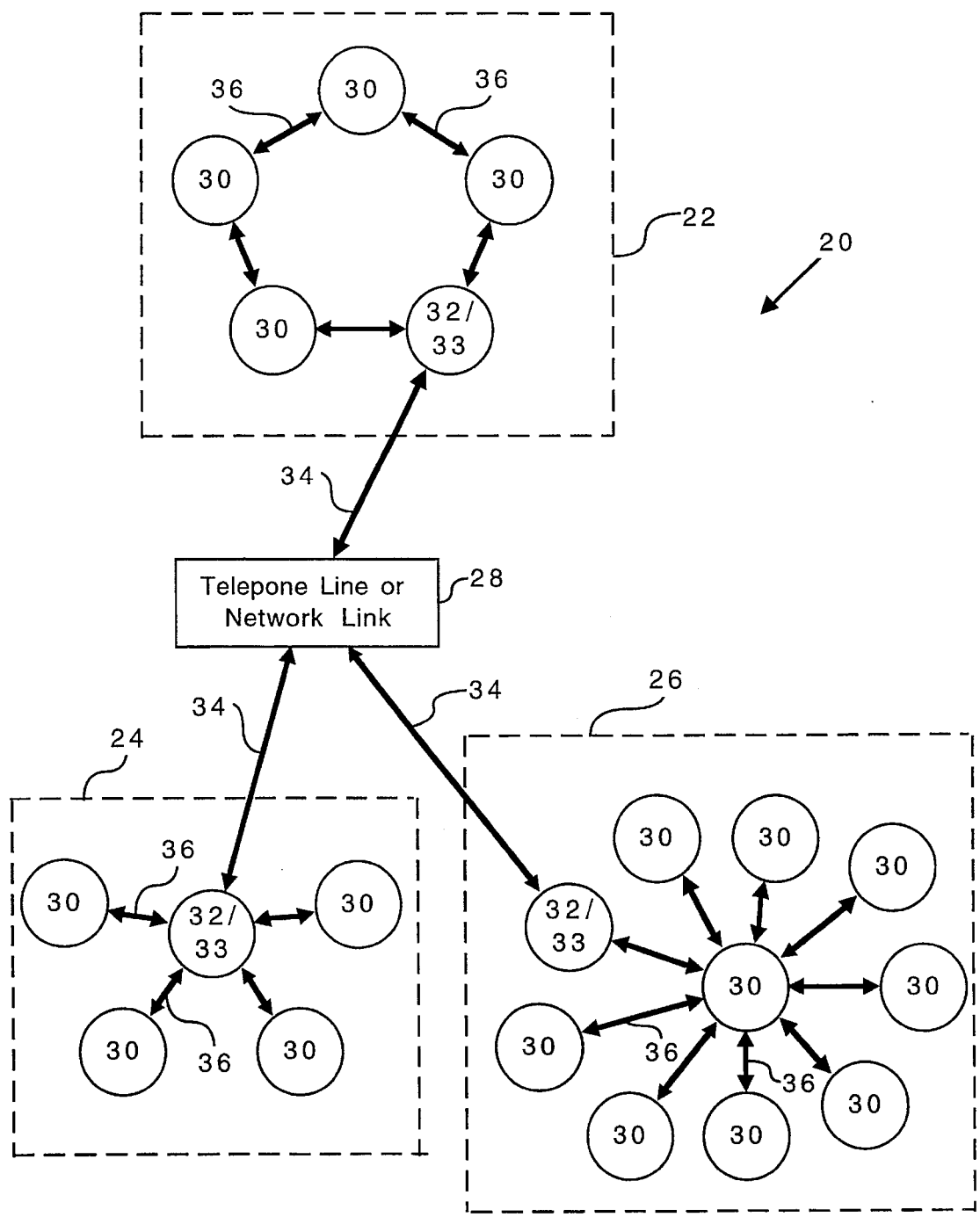
FIG. 1 is a block diagram of a prior art information system with a plurality of networks and a plurality of nodes upon which the present invention operates.

The virus detection system and method of the present invention preferably operates on an information system 20 as has been described above with reference to FIG. 1. The present invention, like the prior art, preferably includes a plurality of node systems 30 and at least one gateway node 33 for each network 22, 24, 26. However, the present invention is different from the prior art because it provides novel gateway node 33 that also performs virus detection for all files being transmitted into or out of a network. Furthermore, the novel gateway node 33 also performs virus detection on all messages being transmitted into or out of an associated network.

Figure 2:
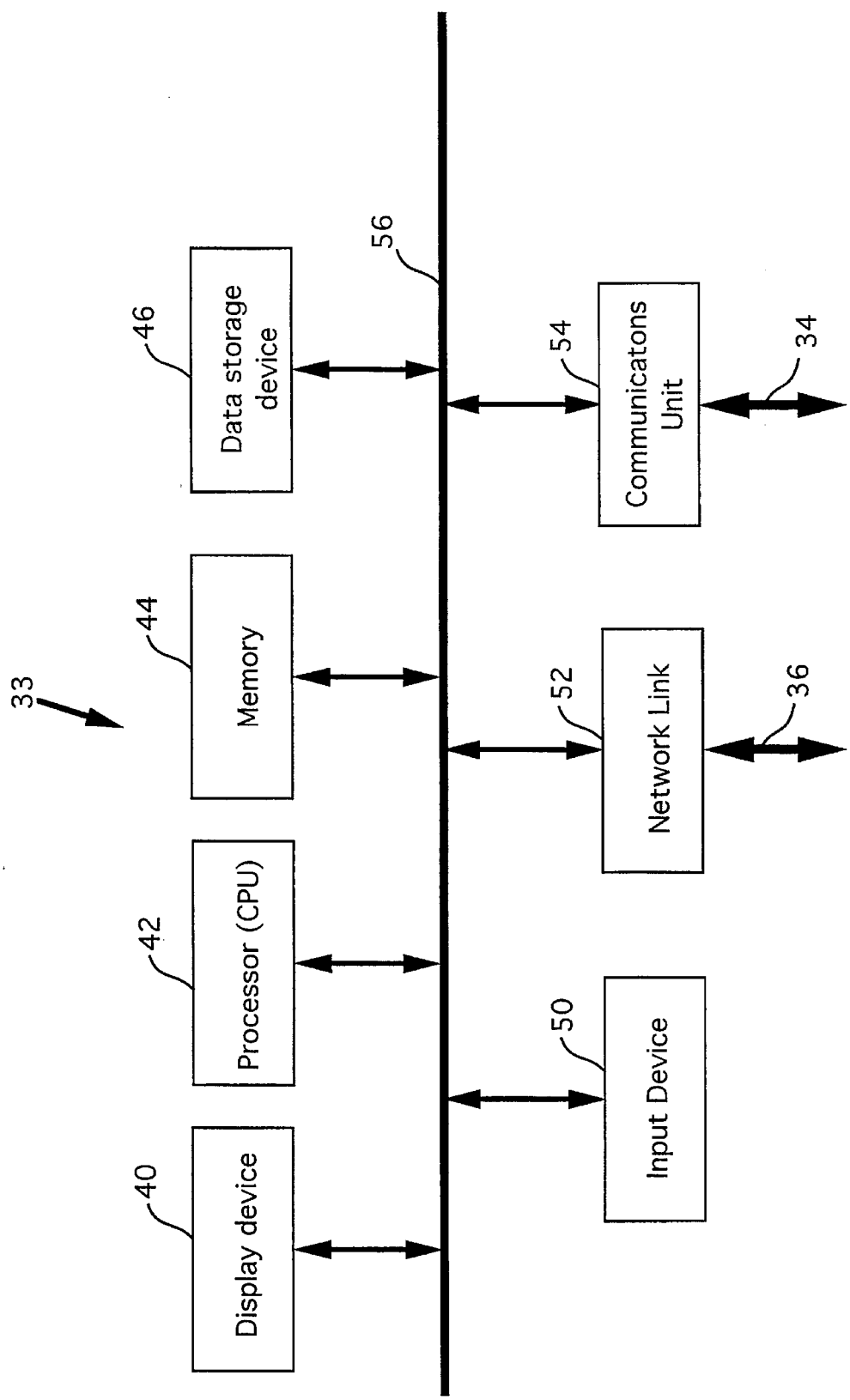
FIG. 2 is a block diagram of a preferred embodiment for a gateway node including the apparatus of the present invention.

Referring now to FIG. 2, a block diagram of a preferred embodiment of the novel gateway node 33 constructed in accordance with the present invention is shown. A preferred embodiment of the gateway node 33 comprises a display device 40, a central processing unit (CPU) 42, a memory 44, a data storage device 46, an input device 50, a network link 52, and a communications unit 54. The CPU 42 is connected by a bus 56 to the display device 40, the memory 44, the data storage device 46, the input device 50, the network link 52, and the communications unit 54 in a von Neumann architecture. The CPU 42, display device 40, input device 50, and memory 44 may be coupled in a conventional manner such as a personal computer. The CPU 42 is preferably a microprocessor such as an Motorola 68040 or Intel Pentium or X86 type processor; the display device 40 is preferably a video monitor; and the input device 50 is preferably a keyboard and mouse type controller. The CPU 42 is also coupled to the data storage device 44 such as a hard disk drive in a conventional manner. Those skilled in the art will realize that the gateway node 33 may also be a minicomputer or a mainframe computer.

The bus 56 is also coupled to the network link 52 to facilitate communication between the gateway node 33 and the other nodes 30 of the network. In the preferred embodiment of the present invention, the network link 52 is preferably a network adapter card including a transceiver that is coupled to a cable or line 36. For example, the network link 52 may be an ethernet card connected to a coaxial line, a twisted pair line or a fiber optic line. Those skilled in the art will realize that a variety of different networking configurations and operating systems including token ring, ethernet, or arcnet may be used and that the present invention is independent of such use. The network link 52 is responsible for sending, receiving, and storing the signals sent over the network or within the protected domain of a given network. The network link 52 is coupled to the bus 56 to provide these signals to the CPU 34 and vice versa.

The bus 56 is also coupled to the communications unit 54 to facilitate communication between the gateway node 33 and the other networks. Specifically, the communications unit 54 is coupled to the CPU 42 for sending data and message to other networks. For example, the communications unit 54 may be a modem, a bridge or a router coupled to the other networks in a conventional manner. In the preferred embodiment of the present invention, the communications unit 54 is preferably a router. The communications unit 54 is in turn coupled to other networks via a media 34 such as a dedicated T-1 phone line, fiber optics, or any one of a number of conventional connecting methods.

The CPU 42, under the guidance and control of instructions received from the memory 44 and from the user through the input device 50, provides signals for sending and receiving data using the communications unit 54. The transfer of data between networks is broken down into the sending and receiving files and messages which in turn are broken down into packets. The methods of the present invention employ a virus detection scheme that is applied to all transfers of messages and files into or out of a network via its gateway node 33.

Figure 3:
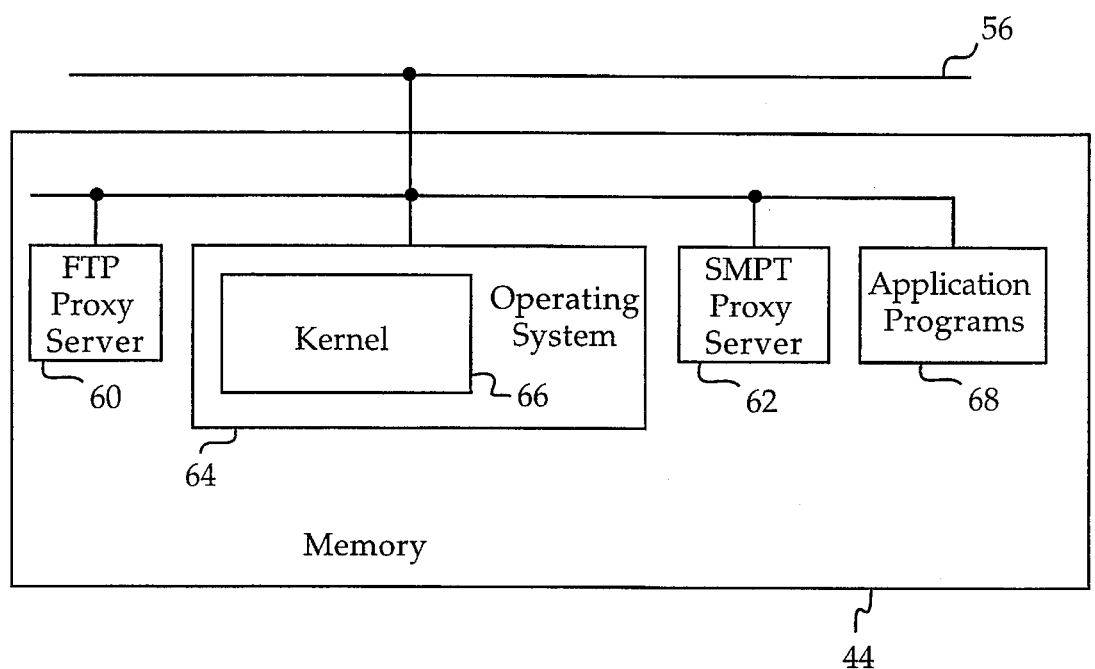
FIG. 3 is a block diagram of a preferred embodiment for a memory of the gateway node including the apparatus of the present invention.

Referring now to FIG. 3, the preferred embodiment of the memory 44 for the gateway node 33 is shown in more detail. The memory 44 is preferably a random access memory (RAM), but may also include read-only memory (ROM). The memory 44 preferably comprises a File Transfer Protocol (FTP) proxy server 60, a Simple Mail Transfer Protocol (SMTP) proxy server 62, and an operating system 64 including a kernel 66. The routines of the present invention for detecting viruses in file transfers and messages primarily include the FTP proxy server 60 and the SMTP proxy server 62. The FTP proxy server 60 is a routine for controlling file transfers to and from the gateway node 33 via the communications unit 54, and thus controlling file transfers to and from a given network of which the gateway node is a part. The operation of the FTP proxy server 60 is described below in more detail with reference to FIGS. 5A, 5B, 6A, 6B and 6C. Similarly, the SMTP proxy server 62 is a routine for controlling the transfer of messages to and from the gateway node 33, and thus to and from the respective network associated with the gateway node 33. The operation of the SMTP proxy server 62 is described below in more detail with reference to FIG. 7 8A and 8B. The present invention preferably uses a conventional operating system 28 such as Berkeley Software Distribution UNIX. Those skilled in the art will realize how the present invention may be readily adapted for use with other operating systems such as MACINTOSH System Software version 7.1, DOS, WINDOWS or WINDOWS NT. The memory 44 may also include a variety of different application programs 68 including but not limited to computer drawing programs, word processing programs, and spreadsheet programs. The present invention is particularly advantageous over the prior because it minimizes the impact of virus detection and elimination since the FTP proxy server 60 and SMTP proxy server 62 are preferably only included or installed in the memory 44 of the gateway nodes 33. Thus, all data being transferred inside the protected domain of a given network will not be checked because the data packets might not be routed via the gateway node 33.

While the apparatus of the present invention, in particular the FTP proxy server 60 and SMTP proxy server 62, has been described above as being located and preferably is located on the gateway node 33, those skilled in the art will realize that the apparatus of the present invention could also be included on a FTP server or a world wide web server for scanning files and messages as they are downloaded from the web. Furthermore, in an alternate embodiment, the apparatus of the present invention may be included in each node of a network for performing virus detection on all messages received or transmitted from that node.

As best shown in FIG. 4, the CPU 42 also utilizes a protocol layer hierarchy to communicate over the network. The protocol layers of the hierarchy of the present invention are shown in FIG. 4 in comparison to the ISO-OSI reference model, for example. The protocol layers 410–426 of the hierarchy of the present invention are similar to the prior art protocol layers for the lower four layers 400–403 including: (1) a physical layer 400 formed of the transmission media 410; (2) a data link layer 401 formed of the network interface cards 411; (3) a network layer 402 formed of address resolution 412, Internet protocol 413 and Internet control message protocol 414; and (4) a transport layer 403 formed of the transmission control protocol 415 and a user datagram protocol 416. Corresponding to the presentation 405 and session 404 layers, the protocol hierarchy of the present invention provides four methods of communication: a file transfer protocol 417, a simple mail transfer protocol 419, a TELNET protocol 419 and a simple network management protocol 420. There are corresponding components on the application layer 406 to handle file transfer 423, electronic mail 424, terminal emulation 425, and network management 426. The present invention advantageously detects, controls and eliminates viruses by providing an additional layer between the application layer 406 and the presentation layer 405 for the gateway nodes 33. In particular, according to the hierarchy of the present invention, a FTP proxy server layer 421 and a SMTP proxy server layer 422 are provided. These layers 421,422 operate in conjunction with the file transfer layer 423 and file transfer protocol 417, and the electronic mail layer 424 and the SMTP protocol layer 418, to process file transfers and messages, respectively. For example, any file transfer requests are generated by the file transfer application 423, first processed by the FTP proxy server layer 421, then processed by the file transfer protocol 417 and other lower layers 415, 413, 411 until the data transfer is actually applied to the transmission media 410. Similarly, any messaging requests are first processed by the SMTP proxy server layer 418, and thereafter processed by the SMTP protocol and other lower layers 415, 413, 411 until the physical layer is reached. The present invention is particularly advantageous because all virus screening is performed below the application level. Therefore, the applications are unaware that such virus detection and elimination is being performed, and these operations are completely transparent to the operation of the application level layers 406. While the FTP proxy server layer 421 and the SMTP proxy server layer 422 have been shown in FIG. 4 as being their own layer to demonstrate the coupling effects they provide between the file transfer layer 423 and file transfer protocol 417, and the electronic mail layer 424 and the SMTP protocol layer 418, those skilled in the art will realize that the FTP proxy server layer 421 and the SMTP proxy server layer 422 can also be correctly viewed as being part of the file transfer protocol layer 417 and the SMTP protocol layer 418, respectively, because they are invisible or transparent to the application layer 406.

Figure 5A:
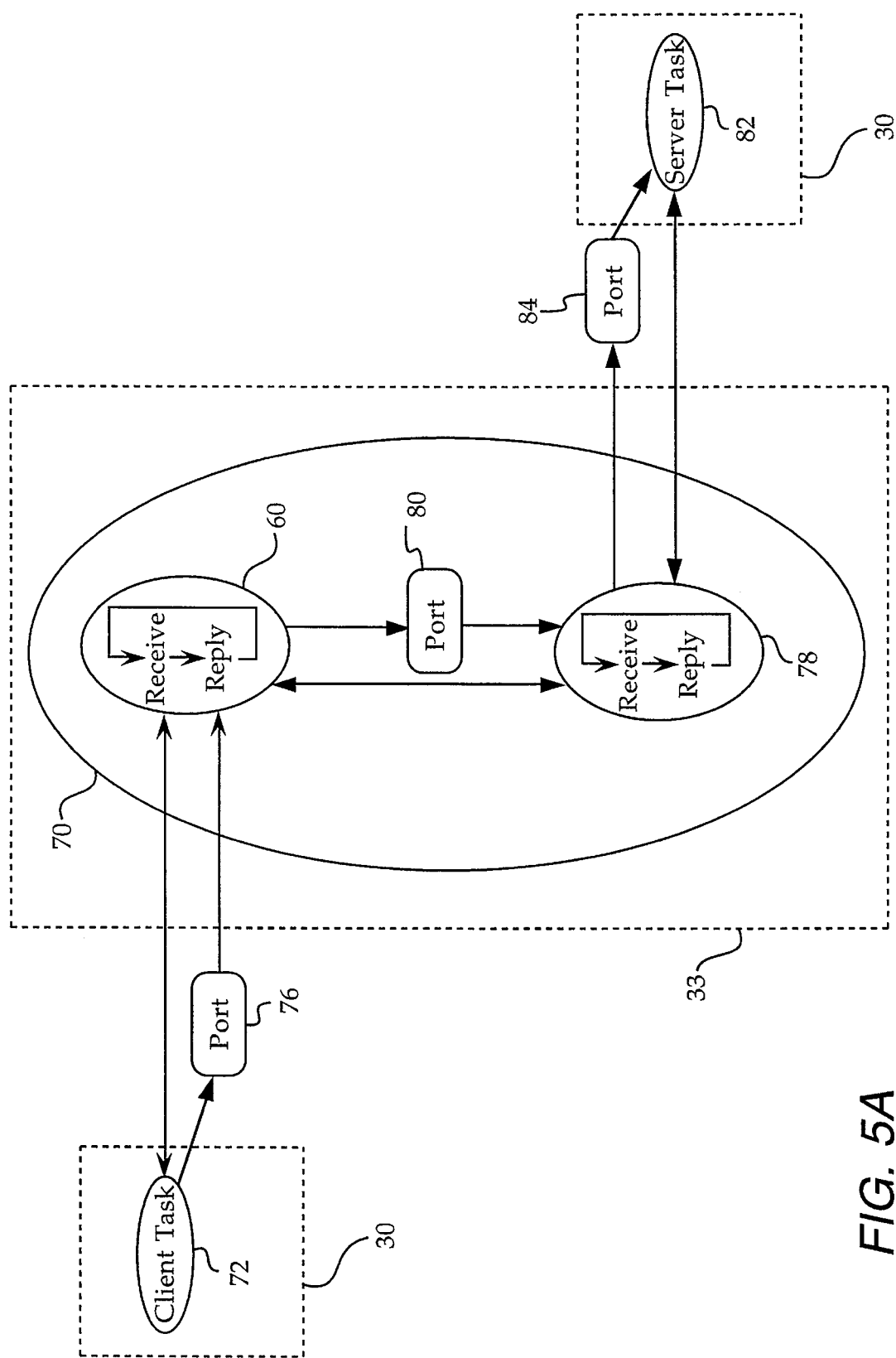
FIG. 5A is a functional block diagram showing a preferred system for sending data files according to a preferred embodiment of the present invention.
Figure 5B:
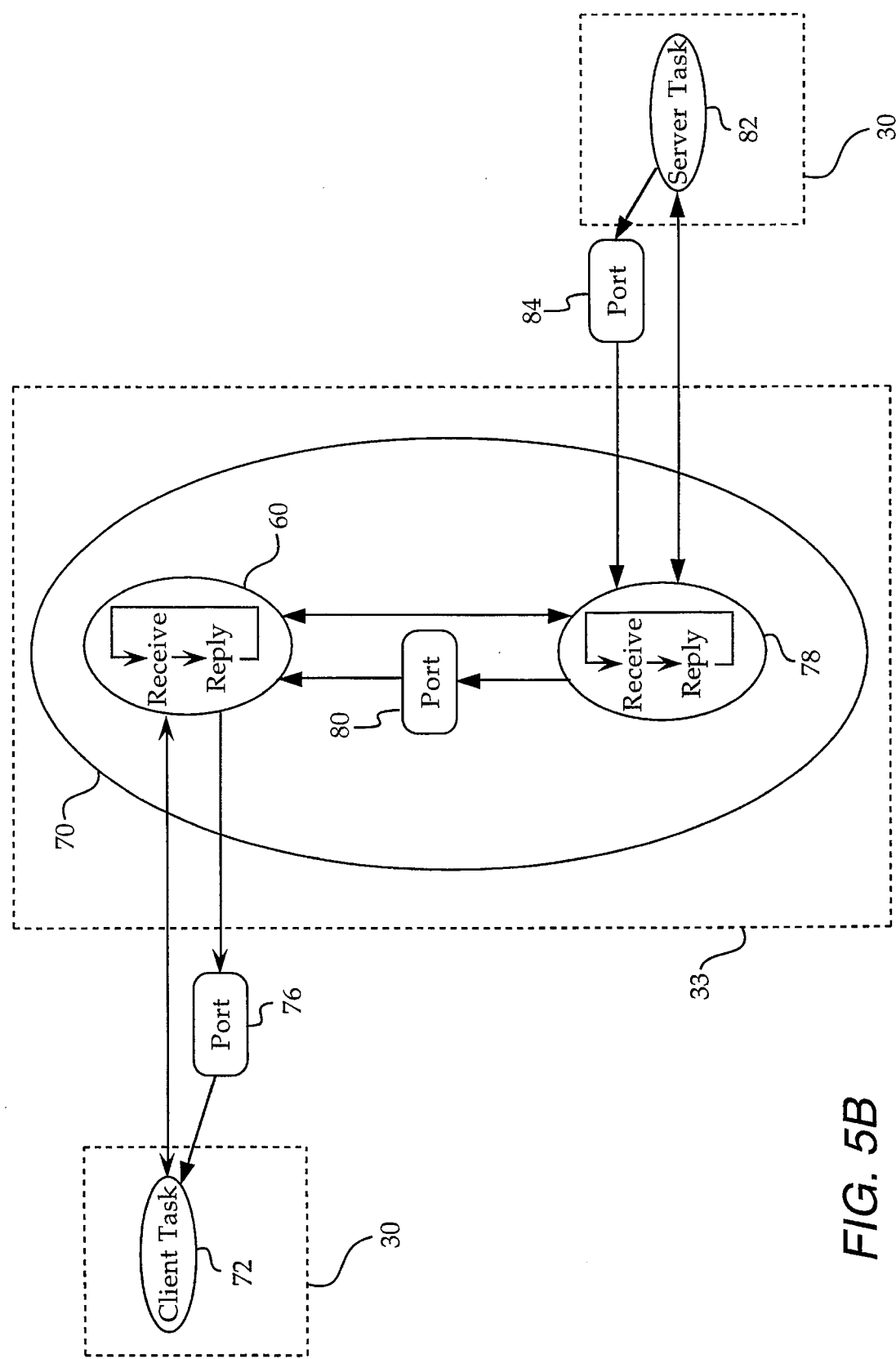
FIG. 5B is a functional block diagram showing a preferred system for receiving data files according to a preferred embodiment of the present invention.

A preferred method of operation and an embodiment for the FTP proxy server 60 will be described focusing on its relationship to and its control of the gateway node 33, and thus, control over access to the medium, line 34, for connections to other networks. The method can best be understood with reference to FIGS. 5A and 5B, that graphically show the functions performed by an Internet daemon 70, the FTP proxy server 60, and an FTP daemon 78, each of which resides on the gateway note 33. In FIGS. 5A and 5B, like reference numbers have been used for like parts and the figures are different only in the direction in which the file is being transferred (either from client task 72 to server task 82 or from server task 82 to client task 72). For the sake of clarity and ease of understanding only the data ports are shown in FIGS. 5A and 5B, and the bi-directional lines represent command or control pathways and are assumed to include a command port although it is not explicitly shown. The operation FTP proxy server 60 will now be described with reference to a file transfer between a client task 72 (requesting machine) and a server task 82 (supplying machine). While it is assumed that the client task 72 (requesting machine) is inside a protected domain and the server task 82 (supplying machine) is outside the protected domain, the invention described below is also used by the gateway node 33 when client task 72 (requesting machine) is outside the protected domain and the server task 82 (supplying machine) is inside the protected domain.

Figure 6A:
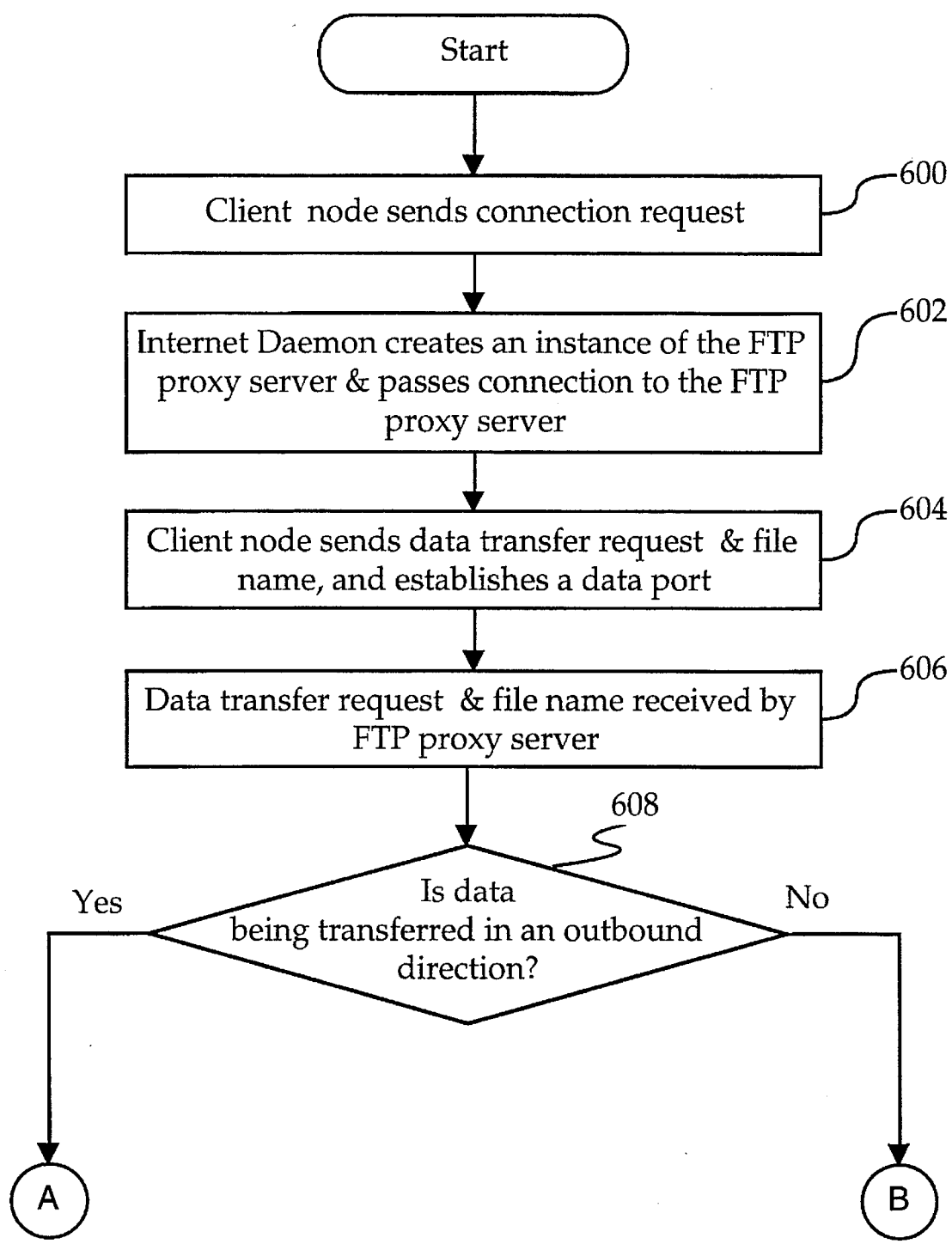
FIGS. 6A, 6B and 6C are a flowchart of the preferred method for performing file transfer according to the present invention.
Figure 6B:
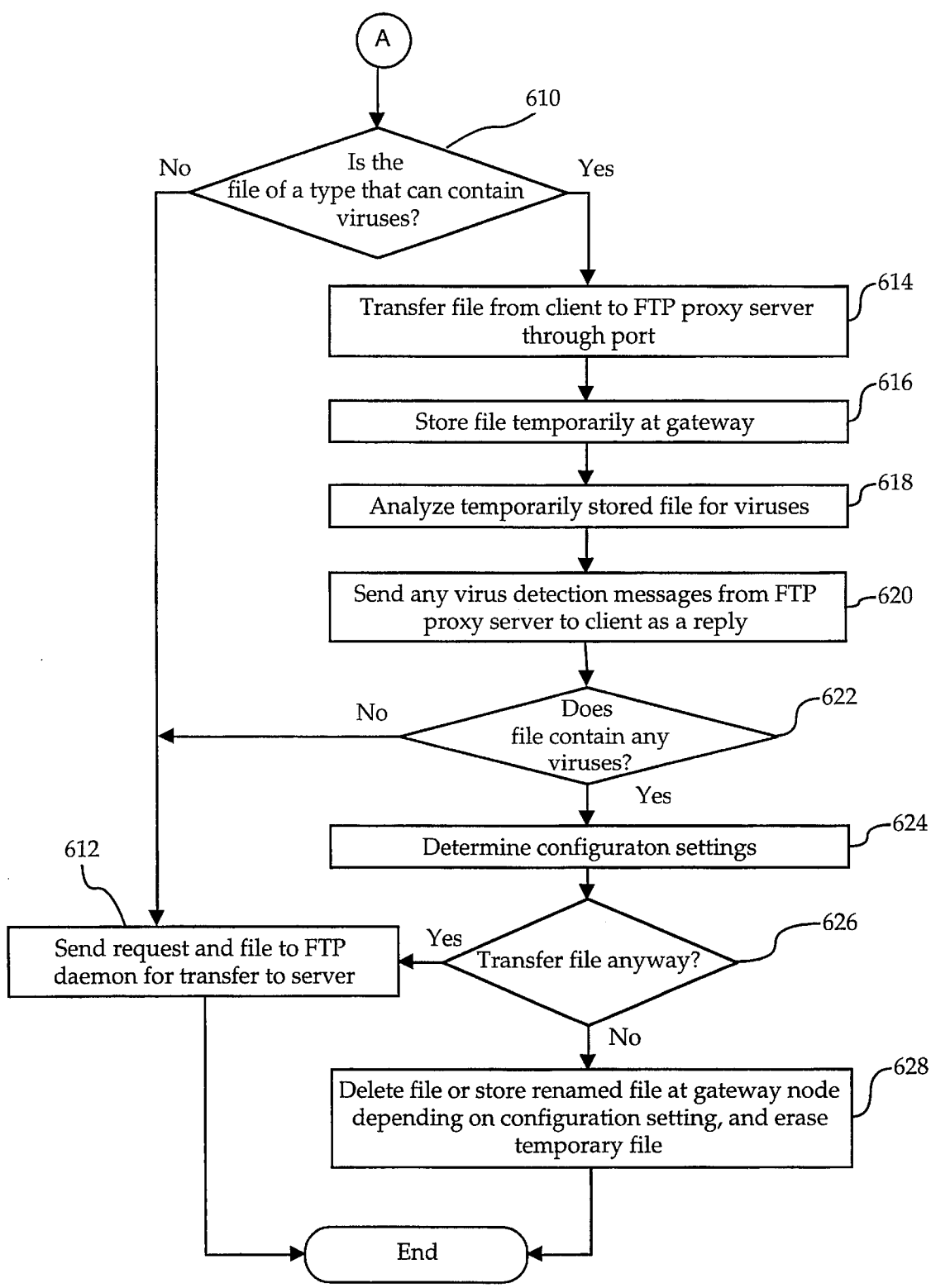
Figure 6C:
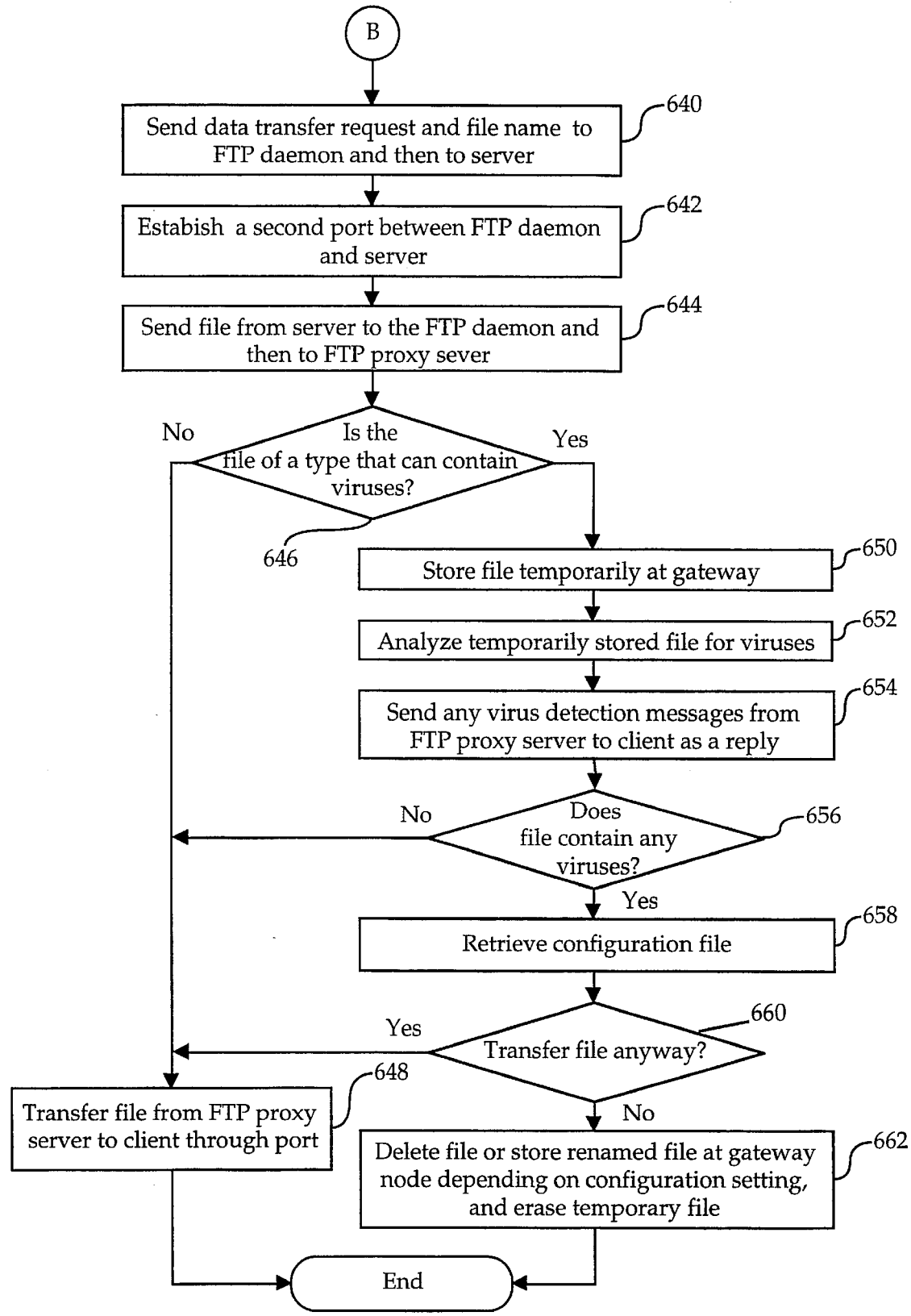

FIGS. 6A–6C are a flowchart of a preferred method for performing file transfers from a controlled domain of a network across a medium 34 to another network (e.g., a file transfer from a node 32 of the second network 24 across the media 34 to a second node 32 of the third network 26). The method begins with step 600 with the client node sending a connection request over the network to the gateway node 33. In step 602, The gateway node 33 preferably has an operating system 64 as described above, and part of the operating system 64 includes a fire wall, or program including routines for authenticating users. The gateway node 33 first tries to authenticate the user and decide whether to allow the connections requested, once the request is received. This is done in a conventional manner typically available as part of UNIX. The Internet daemon 70 creates an instance of the FTP proxy server 60 and passes the connection to the FTP proxy server 60 for servicing in step 602. The Internet daemon 70 is program that is part of the operating system 64, and it runs in the background. When being run, one of the functions of the Internet daemon 70 is to bind socket ports for many well-known services, such as TELNET, login, and FTP. When a connect request is detected, the Internet daemon 70 constructed in accordance with the present invention, spawns the FTP proxy server 60, which is the server that will actually handle the data transfer. Thereafter, the FTP proxy server 60 controls the network traffic passing between the client task 72 and the server task 82. Then in step 604, the client node sends a data transfer request and file name, and established a first data port 76 through which the data will be transferred between the FTP proxy server 60 and the client task 72. In step 606 the data transfer request and file name are received by the FTP proxy server 60. In step 608, the FTP proxy server 60 determines whether the data is being transferred in an outbound direction (e.g., the file is being transferred from the client task 72 to the server task 82). This can be determined by the FTP proxy server 60 by comparing the data transfer request. For example, if the data transfer request is the STOR command then the data is being transferred in an outbound direction; and if the data transfer request is the RETR command then the data is not being transferred in an outbound direction.

If the data is being transferred in an outbound direction, then the method transitions from step 608 to step 610. Referring now to FIG. 6B in conjunction with FIG. 5A, the process for transferring data out of the protected domain of the network is described in more detail. In step 610, the FTP proxy server 60 determines whether the file to be transferred is of a type that can contain viruses. This step is preferably performed by checking the extension of the file name. For example, .txt, .bmd, .pcx and .gif extension files indicate that the file is not likely to contain viruses while .exe, .zip, and .com extension files are of the type that often contain viruses. If the file to be transferred is not of a type that can contain viruses, then the method continues in step 612. In step 612, a second data port 80 is established and the data transfer request & the file are sent from the FTP proxy server 60 to the FTP daemon 78 so that the file can be sent to the server task 82. The FTP daemon 78 is a program executed by the gateway node 33 that communicates the transfer commands to the server task 82, establishes a third port 84 for sending the file including binding the server task 82 and FTP daemon 78 to the third port 84, and transmits the file to the server task 82. Once transmitted, the method is complete and ends. However, if it is determined in step 610 that the file to be transferred is of a type that can contain viruses, the method proceeds to step 614. In step 614, the FTP proxy server 60 transfers the file from the client to the FTP proxy server 60 through the first port 76, and in step 616, the file is temporarily stored at the gateway node 33. Then in step 618, the temporarily stored file is analyzed to determine if it contains viruses. This is preferably done by invoking a virus-checking program on the temporarily stored file. For example, a program the performs a version of signature scanning virus detection such as PC-Cillin manufactured and sold by Trend Micro Devices Incorporated of Cupertino, Calif. may be used. However, those skilled in the art will realize that various other virus detection methods may also be used in step 618. In step 620, output of the virus checking program is preferably echoed to the user/client task 72 by the FTP proxy server 60 as part of a reply message. Next in step 622, the method determines whether any viruses were detected. If no viruses are detected, the method continues in step 612 and transmits the file as has been described above. However, if a virus is detected, the present invention advantageously allows the FTP proxy server 60 to respond in any number of a variety of ways. The response of the FTP proxy server 60 is determined according to user's needs and wants as specified in a configuration file. This configuration file is preferably fully modifiable according to input from the user and stored in memory 44. For example, some options the user might specify are: 1) to do nothing and transfer the file; 2) to delete or erase the temporary file and do not transfer the file; or 3) to rename the file and store it in a specified directory on the gateway node 33 and notify the user of the new file name and directory path which can used to manually request the file from the system administrator. Those skilled in the art will realize that there are variety of other alternatives that users might specify, and steps 624, 626, and 628 are provided only by way of example. Next in step 624, the configuration file is retrieved to determine the handling of the temporary file. In step 626, the FTP proxy server 60 determines if it is to ignore the existence of a virus and a continue the transfer. If so, the method continues in step 612 where the file is passed to the FTP daemon 78 and the temporary file is deleted. If not the method continues to step 628 where either the file is deleted and not sent to the server task 82, and the temporary file is erased from the gateway node 33; or the file is renamed and stored in a specified directory on the gateway node 33 and the user is notified of the new file name and directory path which can used to manually request the file from the system administrator, and the temporary file is erased the gateway node 33. The action taken in step 628 depends on the configuration settings as determined in step 624. After step 628, the method ends. As can be seen from FIG. 5A, the path for the file is from client task 72 through the first data port 76 to the FTP proxy server 60, then to the FTP daemon 78 through the second data port 80 and finally to the server task 82 through the third data port 84.

Referring back to step 608 of FIG. 6A, if the data is not being transferred in an outbound direction, then the method transitions from step 608 to step 640. Referring now to FIG. 6C in conjunction with FIG. 5B, the process for transferring data into the protected domain of the network is described in more detail. In step 640, the FTP proxy server 60 next sends the data transfer request and file name first to the FTP daemon 78 and then on to the server task 82. In step 642, a second port 80 is established between the FTP proxy server 60 and the FTP daemon 78. Then a third data port 84 is established between the FTP daemon 78 and the server task 82. Both ports 80, 84 are established similar to the establishment of the first port 76. The FTP daemon 78 will request and obtain the third port 84 from the Internet daemon 70, and send a port command to the server task 82 including an address for the third port 84. The server task 82 will then connect to the third port 84 and begin the data transfer in step 644. The FTP daemon 78 in turn sends the file to the FTP proxy server 60. Next in step 646, the FTP proxy server 60 determines whether the file to be transferred is of a type that can contain viruses. This is done the same was as described above with reference to step 610. If the file to be transferred is not of a type that can contain viruses, then the method continues in step 648 where the file is transferred from the FTP proxy server 60 through the first port 76 to the client task 72, then the method is complete and ends. On the other hand, if the file to be transferred is a type that can contain viruses, the method in step 650 temporarily stores the file at the gateway node. Then in step 652, the temporarily stored file is analyzed to determine if it contains viruses. The analysis here is the same as step 618. In step 652, the output of the virus checking program is preferably echoed to the client task 72 by the FTP proxy server 60 as part of a reply message. Next in step 656, the method determines whether any viruses were detected. If no viruses are detected, the method continues in step 648 as has been described above. However, if a virus is detected, the present invention retrieves the configuration file to determine the handling of the temporary file. In step 660, the FTP proxy server 60 determines if it is to ignore the existence of a virus and a continue the file transfer. If so the method continues in step 648 where the file is passed to the client task 72 and the temporary file is erased. If not the method continues to step 662 where the temporary file is erased, and the file is either deleted and not sent to the client task 72 or the file is renamed, stored on the gateway node 33, and the client task 72 is notified of new name and path so that the file may be manually retrieved by the system administrator. The method then ends. As can be seen from FIG. 5B, the data transfer request is passed from the client task 72, to the FTP proxy server 60, then to the FTP daemon 78, and to the server task 82 which in response sends the file through the third port to the FTP daemon 78, and through the second port 80 on to the FTP proxy server 60, and finally through the first port 76 to the client task 72.

Figure 7:
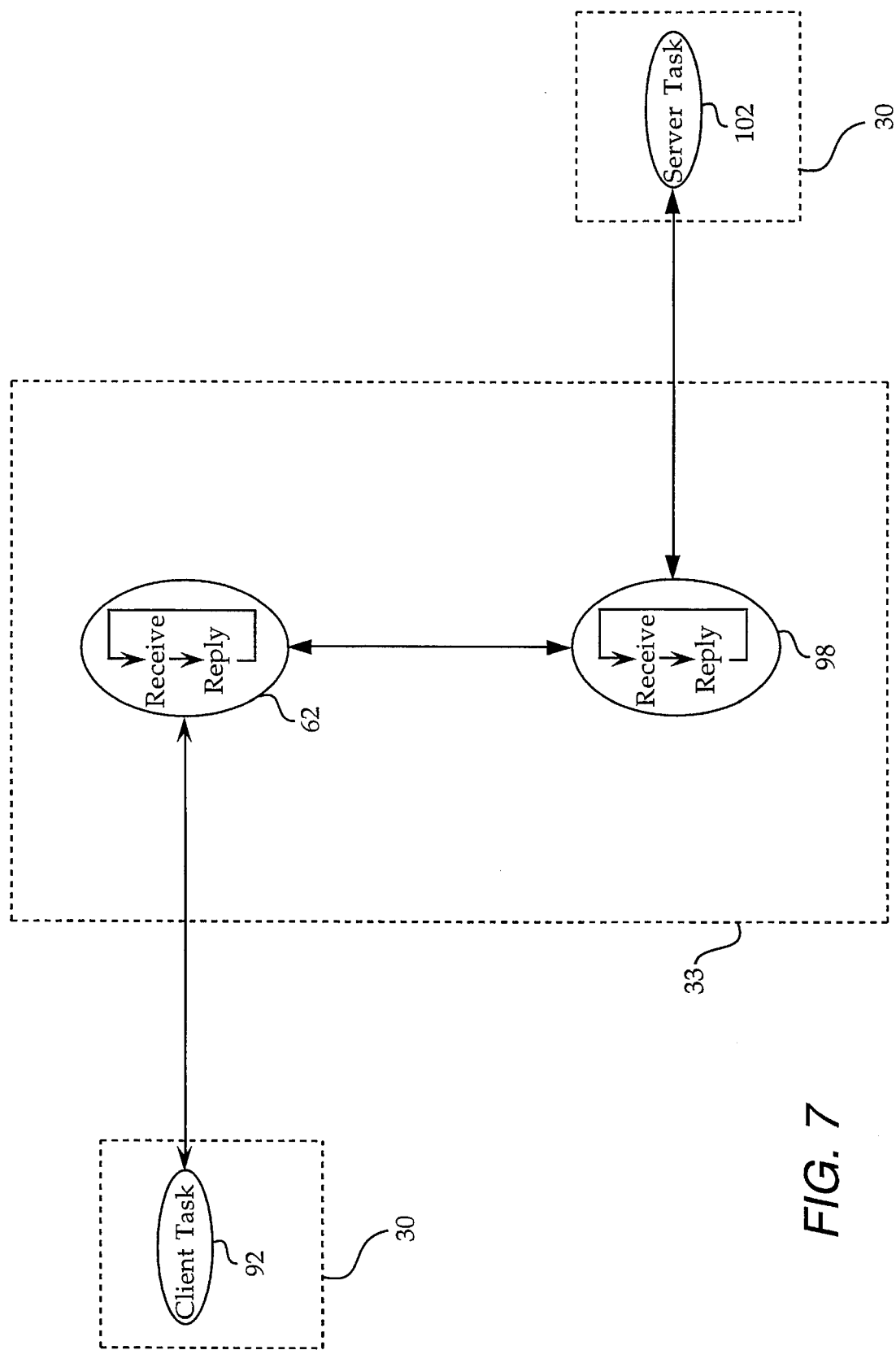
FIG. 7 is a functional block diagram showing a preferred system for transmitting mail messages according to a preferred embodiment of the present invention.
Figure 8A:
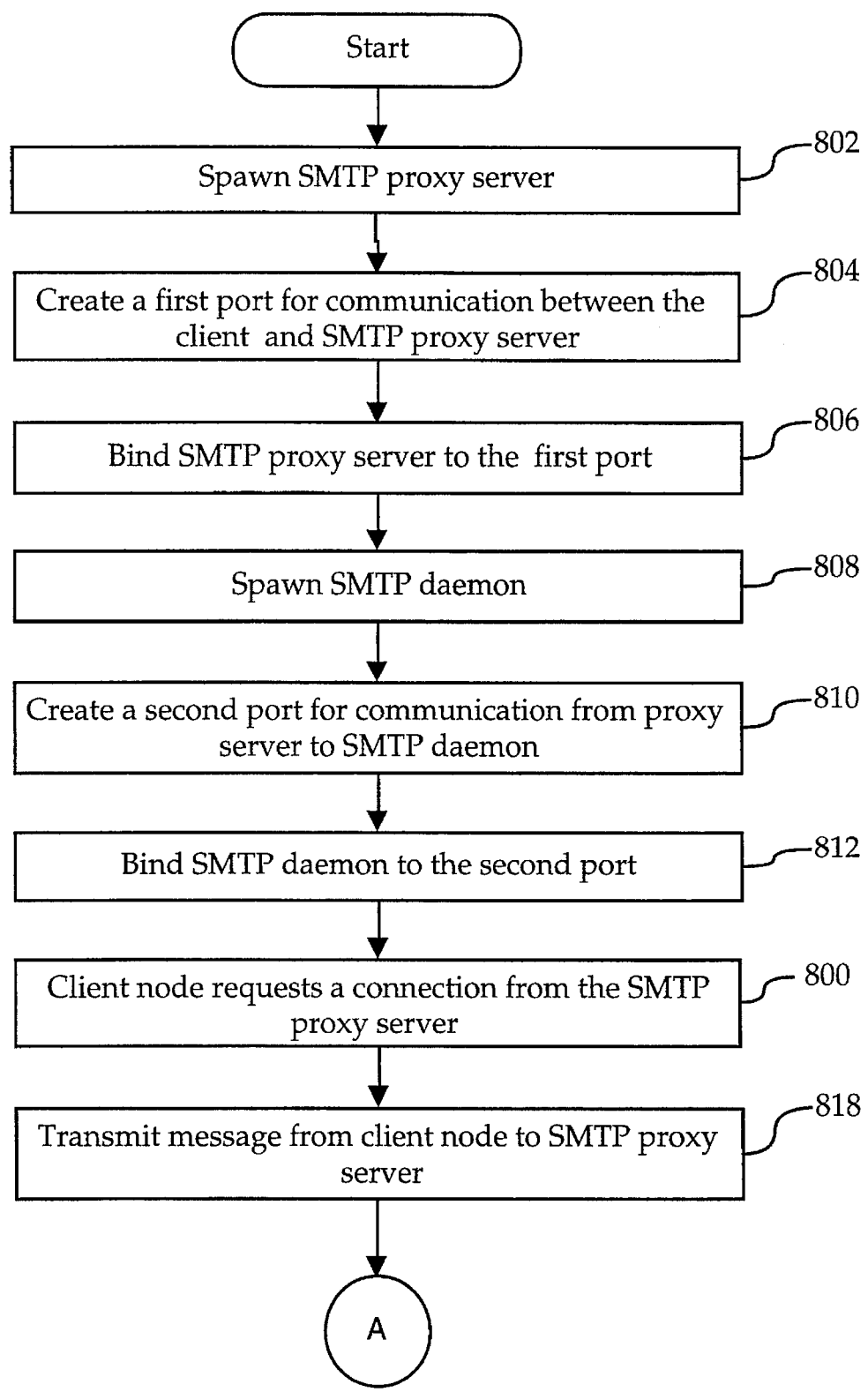
FIGS. 8A and 8B are a flow chart of a preferred method for sending messages to/from a network.
Figure 8B:
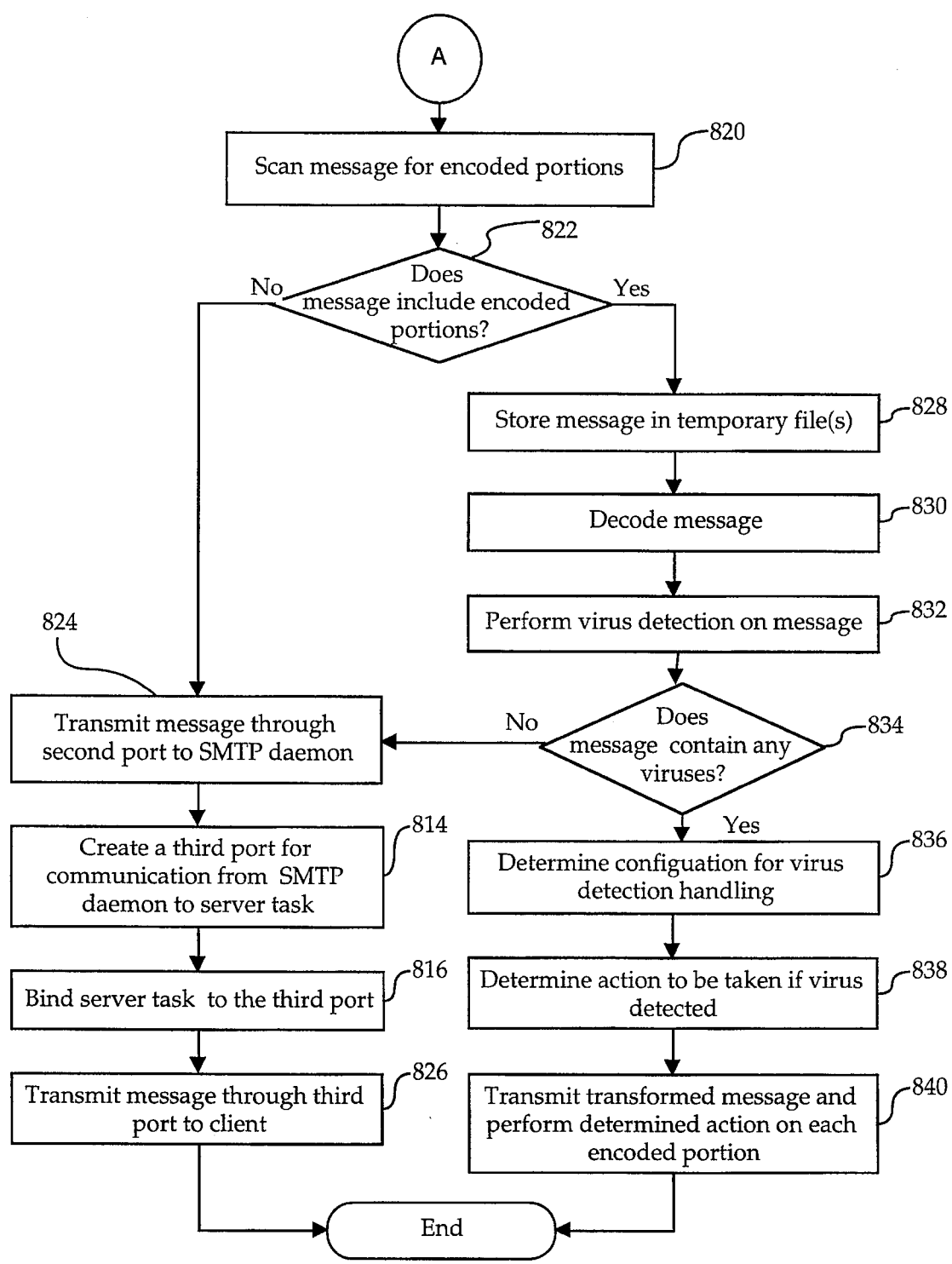

Referring now to FIGS. 7, 8A and 8B, the operation of the SMTP proxy server 62 will now be described. The SMTP proxy server 62 controls the only other entry channel through which data, and therefore viruses, can enter the protected domain of a given network. The SMTP proxy server 62 is preferably a program that resides on the gateway node 33, and controls and handles all transfers of electronic messages or mail in and out of the network through the communications unit 54 and media 34. While the SMTP proxy server 62 will now be described with reference to the transfer of a mail message from a client task 92 within the protected domain of the network to a server task 102 at a node on a different network outside the protected domain, those skilled in the art will understand how the SMTP proxy server 62 handles incoming mail messages in the same way. All mail messages are handled by the SMTP proxy server 62 in the same way and only the designation of which node 32 is the server and which is the client change depending on the direction the message is being sent from the perspective of the gateway node 33. Since mail messages are passed using the command pathways between nodes, only these pathways are shown in FIG. 7. For ease of understanding, the command ports have not been shown in FIG. 7, but will be discussed below in the relevant steps of the preferred method.

Referring now to FIG. 8A, the preferred method of the present invention for sending electronic mail begins in step 802 with the spawning or running the SMTP proxy server 62. Next in step 804, a first command port 96 for communication between the client task(s) 92 and the SMTP proxy server 62 is created. The address of the first port 96 along with a port command is provided to the SMTP proxy server 62. Then in step 806, the SMTP proxy server 62 is bound to the first port 96 to establish a channel for sending a mail message between any client tasks and the SMTP proxy server 62. Next in step 808, the SMTP proxy server 62 spawns a SMTP daemon 98 or SMTP server. The SMTP daemon 98 is preferably the existing program "sendmail" that is part of the BSD UNIX operating system. This is particularly advantageous because it reduces the amount of code that needs to be written and assures compatibility with the lower layers of the OSI reference model. Then in step 810 a second command port is created for communication between the SMTP proxy server 62 and the SMTP daemon 98. In step 812, the SMTP daemon 98 is bound to the second command port for communication with the SMTP proxy server 62. Actually, the present invention binds the SMTP daemon 98 to the appropriate port, namely the second port by redefining the bind function in a shared library that is part of the operating system 64. The present invention advantageously exploits the fact that the SMTP daemon 98 (sendmail programs on most UNIX systems) are dynamically linked. The present invention utilizes a shared library which redefines the system call bind() and forces sendmail to link with the redefined version of the bind() call when executed. If the redefined version of the bind() call determines the SMTP daemon 98 (sendmail program) is trying to bind to the first command port (the smtp port), it will return to it a socket whose other end is the SMTP proxy server 62 (a socket to the second command port). Next in step 800, the client task 92 request a connection from the SMTP proxy server and is directed to used the first command port for communication. Then in step 818, the message is transmitted from the client task 92 through the first command port to the SMTP proxy server 62.

Referring now to FIG. 8B, the method continues in step 820 with the SMTP proxy server 62 scanning the message body and checking for any portions that are encoded. The present invention preferably scans the message for portions that have been encoded with an "uuencoded" encoding scheme that encodes binary data to ASCII data. "Uuencoded" portions of messages usually start with a line like "begin 644 filename," and end with a line like "end." The existence of such encoded portions suggests the possibility that a file may contain viruses. This scanning for "uuencoded" portions is just one of many scanning techniques that may be used, and those skilled in the art will realize that the present invention could be modified to scan for other encoded portions such as those encoded according to other schemes such as mime. Next in step 822, the SMTP proxy server 62 determines whether the message includes any encoded portions. If the message does not include any encoded portions, the SMTP proxy server 62 transmits the message through the second command port to the SMTP daemon 98 in step 824. Next in step 814, the SMTP daemon 98 creates a third command port for communication between the SMTP daemon 98 and the server task 102. Then in step 816 the server task 102 is bound to the third command port to establish communication between the server task 102 and the SMTP daemon 98. Those skilled in the art will realize that if the server task 102 resides on the gateway node 33, then steps 814 and 816 are not needed and may be omitted since no further transfer of data across the network is needed. Then the SMTP daemon 98 transmits the message through the third command port to the server task 102 in step 826 thereby completing the method.

On the other hand if in step 822 it is determined the message does include encoded portions, the SMTP proxy server 62 stores each of the encoded portions of the message in its own temporary file at the gateway node 33 in step 828. For example, if a message included three encoded portions, each encoded portion will be stored in a separate file. Then in step 830, each of the encoded portions stored in its own file is individually decoded using uudecode program, as will be understood by those skilled in the art. Such decoding programs known in the art convert the ASCII files back to their original binary code. Next in step 832, the SMTP proxy server 62 calls and executes a virus-checking program on each message portion stored in its temporary file(s). Then in step 834, the SMTP proxy server 62 determines whether any viruses were detected. If no viruses are detected, the method continues to steps 824, 814, 816 and 826 as has been described above. However, if a virus is detected, the present invention advantageously allows the SMTP proxy server 62 to respond in any number of a variety of ways, just as the FTP proxy server 60. The response of the SMTP proxy server 62 is also determined by the according to user's needs and wants as specified in a configuration file. This configuration file is preferably fully modifiable according to input from the user. The configuration for virus handling is determined in step 836. This could be done by retrieving and reading the configuration file or simply retrieving the configuration data already stored in memory 44. Then in step 838, the action to be taken is determined from the configuration settings. For example, some options the user might specify are: 1) to do nothing and transfer the mail message unchanged; 2) to transfer the mail message with the encoded portions that have been determined to have viruses deleted from the mail message; 3) rename the encode portions of the message containing viruses, store the renamed portions as files in a specified directory on the SMTP proxy server 62 and notify the user of the renamed files and directory path which can used to manually request the file from the system administrator; or 4) writing the output of step 832 into the mail message in place of the respective encoded portions and sending that mail message in steps 824 and 826. Once the action to be performed has been determined from examination of the configuration file, the specified action is taken in step 840, the transformed message is transmitted, the temporary file is erased, and the method ends. For example, if a message has three encoded portions, two encoded portions contain viruses, and the configuration file indicates that virus containing portions are to be deleted, then the method of the present invention would send a transformed message that was the same as the original message, but with the two encoded portions containing viruses deleted, to the server task 102.

While the present invention has been described with reference to certain preferred embodiments, those skilled in the art will recognize that various modifications may be provided. For example, the preferred operation of the present invention specifies that the FTP proxy server 60 determine whether the file type is one that can contain a virus (Steps 610 and 646). However, alternate embodiments can omit these steps and simply temporarily store and scan all files being transferred for viruses. Likewise the SMTP proxy server 60 may, in alternate embodiments, omit the step 822 of determining whether the message is encoded and temporarily store and scan all message being transmitted for viruses. Furthermore, while the invention has been described above as temporarily storing the file or message at the gateway node in a temporary file, this step could be omitted in the determination of whether a file includes a virus were done as the file was being transferred from the client node to the gateway node. These and other variations upon and modifications to the preferred embodiment are provided for by the present invention which is limited only by the following claims.

What is claimed is:

1. A system for detecting and selectively removing viruses in data transfers, the system comprising:

a memory for storing data and routines, the memory having inputs and outputs, the memory including a server for scanning data for a virus and specifying data handling actions dependent on an existence of the virus;

a communications unit for receiving and sending data in response to control signals, the communications unit having an input and an output;

a processing unit for receiving signals from the memory and the communications unit and for sending signals to the memory and communications unit; the processing unit having inputs and outputs; the inputs of the processing unit coupled to the outputs of memory and the output of the communications unit; the outputs of the processing unit coupled to the inputs of memory, the input of the communications unit, the processor controlling and processing data transmitted through the communications unit to detect viruses and selectively transfer data depending on the existence of viruses in the data being transmitted;

a proxy server for receiving data to be transferred, the proxy server scanning the data to be transferred for viruses and controlling transmission of the data to be transferred according to preset handing instructions and the presence of viruses, the proxy server having a data input a data output and a control output the data input coupled to receive the data to be transferred; and a daemon for transferring data from the proxy server in response to control signals from the proxy server, the daemon having a control input, a data input and a data output the control input of the daemon coupled to the control output of the proxy server for receiving control signals, and the data input of the daemon coupled to the data output of the proxy server for receiving the data to be transferred.

2. The system of claim 1, wherein the proxy server is a FTP proxy server that handles evaluation and transfer of data files, and the daemon is an FTP daemon that communicates with a recipient node and transfers data files to the recipient node.

3. The system of claim 1, wherein the proxy server is a SMTP proxy server that handles evaluation and transfer of messages, and the daemon is an SMTP daemon that communicates with a recipient node and transfers messages to the recipient node.

4. A computer implemented method for detecting viruses in data transfers between a first computer and a second computer, the method comprising the steps of:

receiving at a server a data transfer request including a destination address;

electronically receiving data at the server;

determining whether the data contains a virus at the server;

performing a preset action on the data using the server if the data contains a virus;

sending the data to the destination address if the data does not contain a virus;

determining whether the data is of a type that is likely to contain a virus; and transmitting the data from the server to the destination without performing the steps of determining whether the data contains a virus and performing a preset action if the data is not of a type that is likely to contain a virus.

5. The method of claim 4, further comprising the steps of storing the data in a temporary file at the server after the step of electronically transmitting; and wherein the step of determining includes scanning the data for a virus using the server.

6. The method of claim 5, wherein the step of scanning is performed using a signature scanning process.

7. The method of claim 4, wherein the step of performing a preset action on the data using the server comprises performing one step from the group of:

transmitting the data unchanged;

not transmitting the data; and storing the data in a file with a new name and notifying a recipient of the data transfer request of the new file name.

8. The method of claim 4, wherein the step of determining whether the data is of a type that is likely to contain a virus is performed by comparing an extension type of a file name for the data to a group or known extension types.

9. The method of claim 4, further comprising the steps of:

determining whether the data is being transferred into a first network by comparing the destination address to valid addresses for the first network;

wherein the server is a FTP proxy server;

wherein the step of electronically receiving data comprises the steps of transferring the data from a client node to the FTP proxy server, if the data is not being transferred into the first network; and wherein the step of electronically receiving data comprises the steps of transferring the data from a server task to an FTP daemon, and then from the FTP daemon to the FTP proxy server if the data is being transferred into the first network.

10. The method of claim 4, further comprising the steps of:

determining whether the data is being transferred into a first network by comparing the destination address to valid addresses for the first network;

wherein the server is a FTP proxy server;

wherein the step of sending the data to the destination address comprises transferring the data from the FTP proxy server to a node having the destination address, if the data is being transferred into the first network; and wherein the step of sending the data to the destination address comprises transferring the data from the FTP proxy server to a FTP daemon, and then from an FTP daemon to a node having the destination address, if the data is not being transferred into the first network.

11. A computer implemented method for detecting viruses in a mail message transferred between a first computer and a second computer, the method comprising the steps of:

receiving a mail message request including a destination address;

electronically receiving the mail message at a server;

determining whether the mail message contains a virus, the determination of whether the mail message contains a virus comprising determining whether the mail message includes any encoded portions, storing each encoded portion of the mail message in a separate temporary file, decoding the encoded portions of the mail message to produced decoded portions of the mail message, scanning each of the decoded portions for a virus, and testing whether the scanning step found any viruses;

performing a preset action on the mail message if the mail message contains a virus; and sending the mail message to the destination address if the mail message does not contains a virus.

12. The method of claim 11, wherein the step of determining whether the mail message includes any encoded portions searches for uuencoded portions.

13. A computer implemented method for detecting viruses in a mail message transferred between a first computer and a second computer, the method comprising the steps of:

receiving a mail message request including a destination address; electronically receiving the mail message at a server; scanning the mail message for encoded portions; determining whether the mail message contains a virus;

performing a preset action on the mail message if the mail message contains a virus;

sending the mail message to the destination address if the mail message does not contains a virus; and wherein the step of sending the mail message to the destination address is performed if the mail message does not contain any encoded portions; the server includes a SMTP proxy server and a SMTP daemon; and the step of sending the mail message comprises transferring the mail message from the SMTP proxy server to the SMTP daemon and transferring the mail message from the SMTP daemon to a node having an address matching the destination address.

14. The method of claim 11, wherein the step of determining whether the mail message contains a virus, further comprises the steps of:

storing the message in a temporary file;

scanning the temporary file for viruses; and testing whether the scanning step found a virus.

15. The method of claim 11, wherein step of scanning is performed using a signature scanning process.

16. The method of claim 11, wherein the step of performing a preset action on the mail message comprises performing one step from the group of:

transferring the mail message unchanged;

not transferring the mail message;

storing the mail message as a file with a new name and notifying a recipient of the mail message request of the new file name; and creating a modified mail message by writing the output of the determining step into the modified mail message and transferring the mail message to the destination address.

17. The method of claim 11, wherein the step of performing a preset action on the mail message comprises performing one step from the group of:

transferring the mail message unchanged;

transferring the mail message with the encoded portions having a virus deleted; and renaming the encode portions of the mail message containing a virus, and storing the renamed portions as files in a specified directory on the server and notifying a recipient of the renamed files and directory; and writing the output of the determining step into the mail message in place of respective encoded portions that contain a virus to create a modified mail message and sending the modified mail message.

18. An apparatus for detecting viruses in data transfers between a first computer and a second computer, the apparatus comprising:

means for receiving a data transfer request including a destination address;

means for electronically receiving data at a server;

means for determining whether the data contains a virus at the server;

means for performing a preset action on the data using the server if the data contains a virus; and means for sending the data to the destination address if the data does not contain a virus.

19. The apparatus of claim 18, wherein means for determining includes a means for scanning that scans the data using a signature scanning process.

20. The apparatus of claim 18, wherein the means for performing a preset action comprises:

means for transmitting the data unchanged;

means for not transmitting the data; and means for storing the data in a file with a new name and notifying a recipient of the data transfer request of the new file name.

21. The apparatus of claim 18; further comprising:

a second means for determining whether the data is of a type that is likely to contain a virus; and means for transmitting the data from the server to the destination without performing the steps of scanning, determining, performing and sending, if the data is not of a type that is likely to contain a virus.

22. The apparatus of claim 18, further comprising means for determining whether the data is being transferred into a first network by comparing the destination address to valid addresses for the first network.

* * * * *

(12) EX PARTE REEXAMINATION CERTIFICATE (9442nd)
United States Patent
Ji et al.

(10) Number: US 5,623,600 C1
(45) Certificate Issued: Dec. 17, 2012

(54) VIRUS DETECTION AND REMOVAL APPARATUS FOR COMPUTER NETWORKS

(75) Inventors: Shuang Ji, Foster City, CA (US); Eva Chen, Cupertino, CA (US)

(73) Assignee: Trend Micro, Incorporated, Cupertino, CA (US)

Reexamination Request:
No. 90/011,022, Jul. 21, 2010

Reexamination Certificate for:
Patent No.: 5,623,600
Issued: Apr. 22, 1997
Appl. No.: 08/533,706
Filed: Sep. 26, 1995

(51) Int. Cl.
*G06F 1/00* (2006.01)
*G06F 21/00* (2006.01)
*H04L 29/06* (2006.01)
*H04L 12/58* (2006.01)

(52) U.S. Cl. .................................................. 726/24
(58) Field of Classification Search .................. None
See application file for complete search history.

(56) References Cited

To view the complete listing of prior art documents cited during the proceeding for Reexamination Control Number 90/011,022, please refer to the USPTO's public Patent Application Information Retrieval (PAIR) system under the Display References tab.

*Primary Examiner* — Minh Dieu Nguyen

(57) ABSTRACT

A system for detecting and eliminating viruses on a computer network includes a File Transfer Protocol (FTP) proxy server, for controlling the transfer of files and a Simple Mail Transfer Protocol (SMTP) proxy server for controlling the transfer of mail messages through the system. The FTP proxy server and SMTP proxy server run concurrently with the normal operation of the system and operate in a manner such that viruses transmitted to or from the network in files and messages are detected before transfer into or from the system. The FTP proxy server and SMTP proxy server scan all incoming and outgoing files and messages, respectively before transfer for viruses and then transfer the files and messages, only if they do not contain any viruses. A method for processing a file before transmission into or from the network includes the steps of: receiving the data transfer command and file name; transferring the file to a system node; performing virus detection on the file; determining whether the file contains any viruses; transferring the file from the system to a recipient node if the file does not contain a virus; and deleting the file if the file contains a virus.

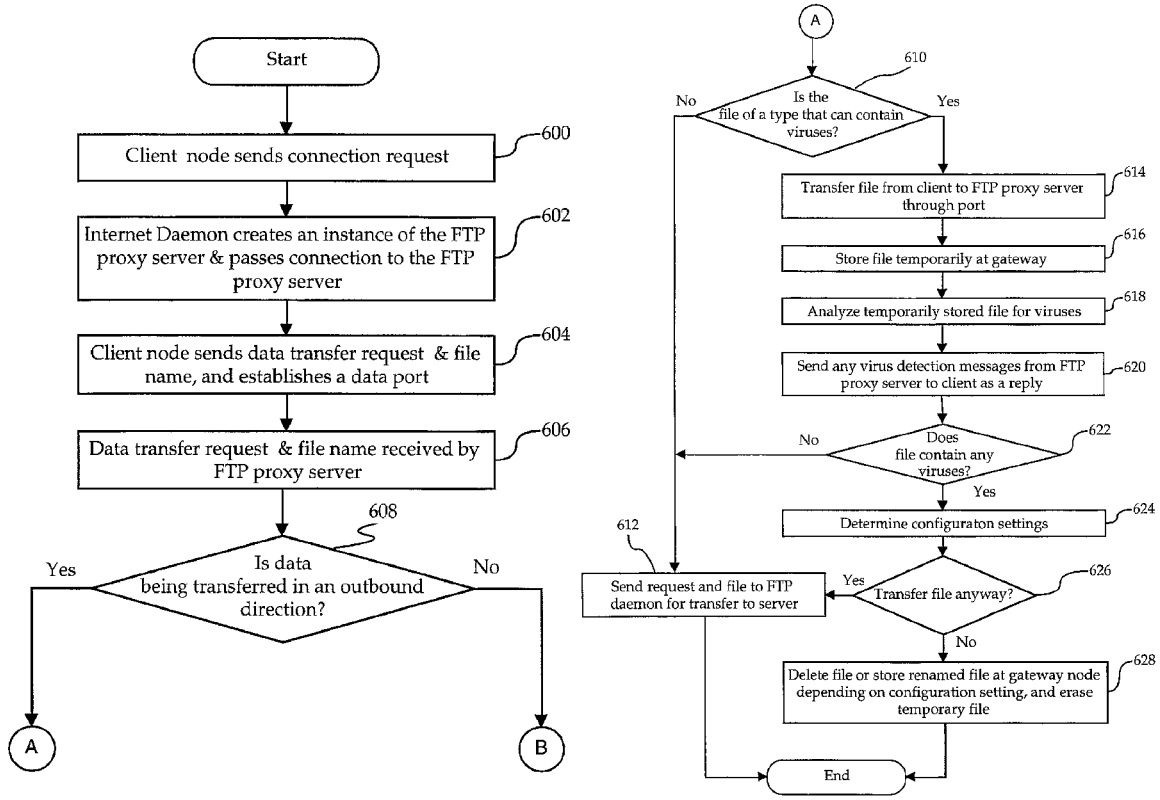

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 10 is confirmed.

Claims 1-7, 9, 11-12 and 14-22 are cancelled.

Claims 8 and 13 are determined to be patentable as amended.

New claims 23-27 are added and determined to be patentable.

8. The method of claim 4, wherein the step of determining whether the data is of a type that is likely to contain a virus is performed by comparing an extension type of a file name for the data to a group [or] *of* known extension types.

13. A computer implemented method for detecting viruses in a mail message transferred between a first computer and a second computer, the method comprising the steps of:
receiving a mail message request including a destination address; electronically receiving the mail message at a server; scanning the mail message for encoded portions; determining whether the mail message contains a virus;
performing a preset action on the mail message if the mail message contains a virus;
sending the mail message to the destination address if the mail message does not [contains] *contain* a virus; and
wherein the step of sending the mail message to the destination address is performed if the mail message does not contain any encoded portions; the server includes a SMTP proxy server and a SMTP daemon; and the step of sending the mail message comprises transferring the mail message from the SMTP proxy server to the SMTP daemon and transferring the mail message from the SMTP daemon to a node having an address matching the destination address.

23. *A computer implemented method for detecting viruses in a mail message transferred between a first computer and a second computer, comprising:*
*receiving a mail message request including a destination address;*
*electronically receiving the mail message at a server;*
*determining whether the mail message contains a virus, the determination of whether the mail message contains a virus comprising (i) determining whether the mail message includes any encoded portions, (ii) storing each encoded portion of the mail message in a separate temporary file, (iii) decoding the encoded portions of the mail message to produce decoded portions of the mail message, (iv) scanning each of the decoded portions for a virus, (v) scanning each unencoded portion of the mail message for a virus, (vi) determining if any of the decoded portions of the mail message contain a virus; and (vii) determining if the unencoded portions of the mail message contain a virus;*
*performing a preset action on the mail message if any of the decoded portions of the mail message contain a virus or if the unencoded portions of the mail message contain a virus; and*
*sending the mail message to the destination address if the mail message does not contain a virus.*

24. *A computer implemented method for detecting viruses in all mail messages transferred between a first computer and a second computer, comprising:*
*receiving a mail message request including a destination address;*
*electronically receiving the mail message at a server;*
*determining for all messages received at the server whether the mail message contains a virus, the determination of whether the mail message contains a virus comprising (i) determining whether the mail message includes any encoded portions, (ii) storing each encoded portion of the mail message in a separate temporary file, (iii) decoding the encoded portions of the mail message to produce decoded portions of the mail message, (iv) scanning each of the decoded portions for a virus, (v) scanning each unencoded portion of the mail message for a virus, (vi) determining if any of the decoded portions of the mail message contain a virus; and (vii) determining if the unencoded portions of the mail message contain a virus;*
*performing a preset action on the mail message if any of the decoded portions of the mail message contain a virus or if the unencoded portions of the mail message contain a virus; and*
*sending the mail message to the destination address if the mail message does not contain a virus.*

25. *A computer implemented method for detecting viruses in data transfers between a first computer, a server comprising a proxy server, and a second computer, the computer implemented method comprising:*
*transmitting, by the first computer, a data transfer request including a destination address of the second computer;*
*receiving at the server the data transfer request and the destination address;*
*electronically receiving data at the server in response to the data transfer request;*
*determining, by the proxy server, whether the data contains a virus, wherein the server utilizes a protocol layer hierarchy that includes an application layer, and wherein the proxy server resides below the application layer and detection of a virus by the proxy server occurs below the application layer;*
*performing, by the server, a preset action on the data if the data contains a virus;*
*sending the data to the destination address of the second computer if the data does not contain a virus;*
*determining, by the proxy server, whether the data is of a type that is likely to contain a virus; and*
*transmitting the data, in response to the data transfer request, from the server to the destination of the second computer without determining whether the data contains a virus and without performing a preset action if the data is not of a type that is likely to contain a virus.*

26. *A computer implemented method for detecting viruses, comprising:*
*receiving, at a server comprising a proxy server, a data transfer request, data, and a destination address;* determining, by the proxy server, whether the data contains a virus, wherein the server utilizes a protocol layer hierarchy that includes an application layer, and wherein the proxy server and detection of a virus by the proxy server occurs below the application layer;

performing, by the server, a preset action on the data if the data contains a virus;

sending the data to the destination address if the data does not contain a virus;

determining, by the proxy server, whether the data is of a type that is likely to contain a virus; and transmitting the data from the server to the destination address without determining whether the data contains a virus and without performing a preset action if the data is not of a type that is likely to contain a virus.

27. A computer implemented method for detecting viruses in a mail message transferred between a first computer and a second computer, the method comprising the steps of:

receiving a mail message request including a destination address;

electronically receiving the mail message at a server;

determining whether the mail message contains a virus, the determination of whether the mail message contains a virus comprising determining whether the mail message includes any encoded portions, storing each encoded portion of the mail message in a separate temporary file, decoding the encoded portions of the mail message to produced decoded portions of the mail message, scanning each of the decoded portions for a virus, and testing whether the scanning step found any viruses;

performing a preset action on the mail message if the mail message contains a virus; and sending the mail message to the destination address if the mail message does not contain a virus;

wherein the step of performing a preset action on the mail message comprises creating a modified mail message by writing the output of the determining step into the modified mail message and transferring the mail message to the destination address.

\* \* \* \* \*